(12) United States Patent
Morita et al.

(10) Patent No.: US 9,817,284 B2
(45) Date of Patent: Nov. 14, 2017

(54) LIQUID CRYSTAL DISPLAY DEVICE

(71) Applicant: Japan Display Inc., Minato-ku (JP)

(72) Inventors: Yusuke Morita, Minato-ku (JP); Jin Hirosawa, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 74 days.

(21) Appl. No.: 14/690,958

(22) Filed: Apr. 20, 2015

(65) Prior Publication Data
US 2015/0261052 A1 Sep. 17, 2015

Related U.S. Application Data

(62) Division of application No. 13/454,711, filed on Apr. 24, 2012, now Pat. No. 9,046,719.

(30) Foreign Application Priority Data

Apr. 25, 2011 (JP) ................. 2011-097003

(51) Int. Cl.
*G02F 1/1343* (2006.01)
*G02F 1/1333* (2006.01)
*G02F 1/1337* (2006.01)

(52) U.S. Cl.
CPC .. *G02F 1/134336* (2013.01); *G02F 1/133345* (2013.01); *G02F 1/134309* (2013.01);
(Continued)

(58) Field of Classification Search
CPC ............ G02F 1/134309; G02F 1/134363
See application file for complete search history.

(56) References Cited

U.S. PATENT DOCUMENTS 6,266,116 B1 7/2001 Ohta et al.
7,411,647 B2 8/2008 Ono et al.
(Continued)

FOREIGN PATENT DOCUMENTS

JP 6-222397 8/1994
JP 7-72491 A 3/1995
(Continued)

OTHER PUBLICATIONS

Japanese Office Action issued May 7, 2013 in Patent Application No. 2011-097033 (English Translation only).

*Primary Examiner* — Edmond Lau
(74) *Attorney, Agent, or Firm* — Oblon, McClelland, Maier & Neustadt, L.L.P.

(57) ABSTRACT

In one embodiment, a first substrate includes a sub-pixel electrode extending in a first direction, a first main pixel electrode connected with one end of the sub-pixel electrode and extending in a second direction orthogonally crossing the first direction, and a second main pixel electrode connected with the other end of the sub-pixel electrode and extending in the second direction. A second substrate includes first and second sub-common electrodes arranged on both sides sandwiching the sub-pixel electrode, a first main common electrode connected with the first sub-common electrode and extending along the second direction opposite to the extending direction of the first main pixel electrode on one end side of the sub-pixel electrode, and a second main common electrode connected with the second sub-common electrode and extending along the second direction opposite to the extending direction of the second main pixel electrode on the other end side of the sub-pixel electrode.

8 Claims, 13 Drawing Sheets

(52) U.S. Cl.
CPC .................. *G02F 1/134363* (2013.01); *G02F 2001/133738* (2013.01); *G02F 2001/134318* (2013.01); *G02F 2001/134345* (2013.01)

(56) References Cited

U.S. PATENT DOCUMENTS

| | | | |
|---|---|---|---|
| 7,538,845 | B2 | 5/2009 | Hasegawa et al. |
| 9,046,719 | B2 * | 6/2015 | Morita .............. G02F 1/134309 |
| 2001/0010575 | A1 | 8/2001 | Yoshida et al. |
| 2004/0165136 | A1 | 8/2004 | Sugiyama et al. |
| 2005/0151910 | A1 | 7/2005 | Park et al. |
| 2005/0206824 | A1 | 9/2005 | Son et al. |
| 2005/0219453 | A1 | 10/2005 | Kubo et al. |
| 2007/0115234 | A1 | 5/2007 | Kim et al. |
| 2008/0002126 | A1 * | 1/2008 | Lim ................. G02F 1/134309 349/141 |
| 2008/0013031 | A1 * | 1/2008 | Ashizawa ......... G02F 1/134363 349/153 |
| 2008/0062358 | A1 | 3/2008 | Lee et al. |
| 2008/0180590 | A1 | 7/2008 | Lee et al. |
| 2008/0180623 | A1 | 7/2008 | Lee et al. |
| 2008/0186439 | A1 | 8/2008 | Kwon et al. |
| 2009/0207363 | A1 | 8/2009 | Hirosawa |
| 2009/0237594 | A1 * | 9/2009 | Matsushima ........ G09G 3/3607 349/62 |
| 2011/0234947 | A1 | 9/2011 | Hirosawa |

FOREIGN PATENT DOCUMENTS

| | | |
|---|---|---|
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-31229 A | 2/1998 |
| JP | 10-48671 A | 2/1998 |
| JP | 10-90708 | 4/1998 |
| JP | 10-307295 A | 11/1998 |
| JP | 11-2837 A | 1/1999 |
| JP | 2000-81641 A | 3/2000 |
| JP | 2003-322867 A | 11/2003 |
| JP | 2004-185011 A | 7/2004 |
| JP | 2005-3802 | 1/2005 |
| JP | 3644653 | 2/2005 |
| JP | 2005-242307 | 9/2005 |

\* cited by examiner

LIQUID CRYSTAL DISPLAY DEVICE

CROSS-REFERENCE TO RELATED APPLICATION

This application is a divisional of U.S. application Ser. No. 13/454,711 filed Apr. 24, 2012, and is based upon and claims the benefit of priority from prior Japanese Patent Application No. 2011-097003, filed Apr. 25, 2011, the entire contents of each of which are incorporated herein by reference.

FIELD

Embodiments described herein relate generally to a liquid crystal display device.

BACKGROUND

In recent years, a flat panel display is developed briskly, and especially, the liquid crystal display device gets a lot of attention from advantages, such as light weight, thin shape, and low power consumption. Especially, in an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
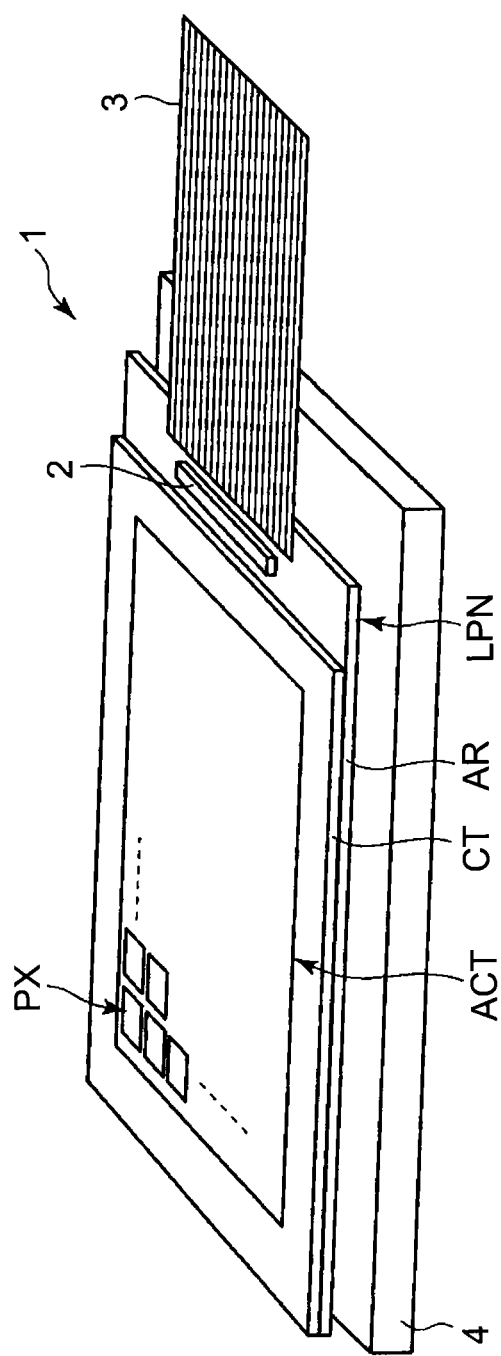
FIG. 1 is a figure schematically showing a structure of a liquid crystal display device according to one embodiment.

A liquid crystal display device according to an exemplary embodiment of the present invention will now be described with reference to the accompanying drawings wherein the same or like reference numerals designate the same or corresponding parts throughout the several views.

According to one embodiment, a liquid crystal display device having a plurality of pixels, includes: a first substrate including; a sub-pixel electrode extending in a first direction, a first main pixel electrode connected with one end of the sub-pixel electrode and extending in a second direction orthogonally crossing the first direction, and a second main pixel electrode connected with the other end of the sub-pixel electrode and extending in the second direction opposite to the extending direction of the first main pixel electrode, a second substrate including; a first sub-common electrode and a second sub-common electrode arranged on both sides sandwiching the sub-pixel electrode, a first main common electrode connected with the first sub-common electrode and extending along the second direction opposite to the extending direction of the first main pixel electrode on one end side of the sub-pixel electrode, and a second main common electrode connected with the second sub-common electrode and extending along the second direction opposite to the extending direction of the second main pixel electrode on the other end side of the sub-pixel electrode, a liquid crystal layer including liquid crystal molecules and held between the first substrate and the second substrate.

FIG. 1 is a figure schematically showing the structure of the liquid crystal display device 1 according to one embodiment.

The liquid crystal display device 1 includes an active-matrix type liquid crystal display panel LPN, a driver IC chip 2 connected to the liquid crystal display panel LPN, a flexible wiring substrate 3, a backlight 4 for illuminating the liquid crystal display panel LPN, etc.

The liquid crystal display panel LPN is equipped with an array substrate AR as a first substrate, a counter substrates CT as a second substrate arranged opposing the array substrate AR, and a liquid crystal layer (not shown) held between the array substrate AR and the counter substrates CT. The liquid crystal display panel LPN includes an active area ACT which displays images. The active area ACT is constituted by a plurality of pixels PX arranged in the shape of a (m×n) matrix (here, "m" and "n" are positive integers).

A backlight 4 is arranged on the back side of the array substrate AR in the illustrated example. Various types of backlights can be used as the backlight 4. For example, a light emitting diode (LED) or a cold cathode fluorescent lamp (CCFL), etc., can be applied as a light source of the backlight 4, and the explanation about its detailed structure is omitted.

Figure 2:
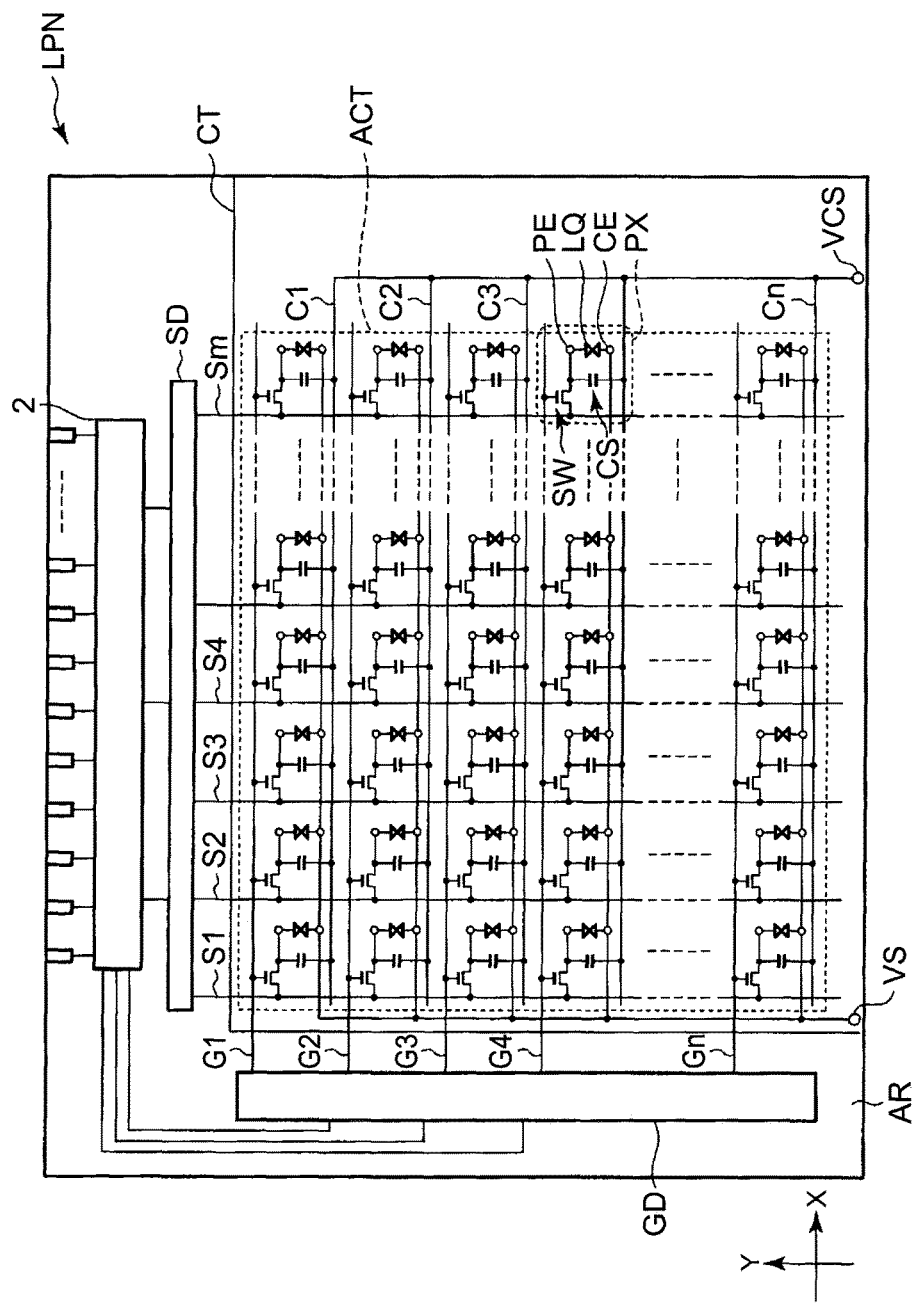
FIG. 2 is a figure schematically showing the structure and the equivalent circuit of a liquid crystal display panel shown in FIG. 1.

FIG. 2 is a figure schematically showing the structure and the equivalent circuit of the liquid crystal display panel LPN shown in FIG. 1.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C are arranged in parallel each other in a first direction X that perpendicularly intersects a second direction Y. However, they do not necessarily extend linearly. The source lines S extend in the second direction Y that intersects the gate line G and the auxiliary capacitance line C in parallel. Though the source lines S extend in the second direction Y, respectively, they do not necessarily extend linearly. The gate line G, the auxiliary capacitance line C and the source lines S may be crooked partially.

Each gate line G is pulled out to the outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE.

In addition, in the liquid crystal display panel LPN according to this embodiment, while the pixel electrode PE is formed in the array substrate AR, the common electrode CE is formed in the counter substrate CT. Liquid crystal molecules of a liquid crystal layer LQ are switched mainly using an electric field formed between the pixel electrodes PE and the common electrodes CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrates.

The switching element SW is constituted by an n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The common electrode CE is set to a common potential, for example. The common electrode CE is arranged in common to the plurality of pixel electrodes PE through the liquid crystal layer LQ. The auxiliary capacitance line C is electrically connected with a voltage impressing portion VCS to which the auxiliary capacitance voltage is impressed.

The array substrate AR includes an electric power supply portion VS formed outside of the active area ACT. Furthermore, the common electrode CE formed on the counter substrate CT is electrically connected with the electric power supply portion VS formed in the array substrate AR through an electric conductive component which is not illustrated.

Figure 3:
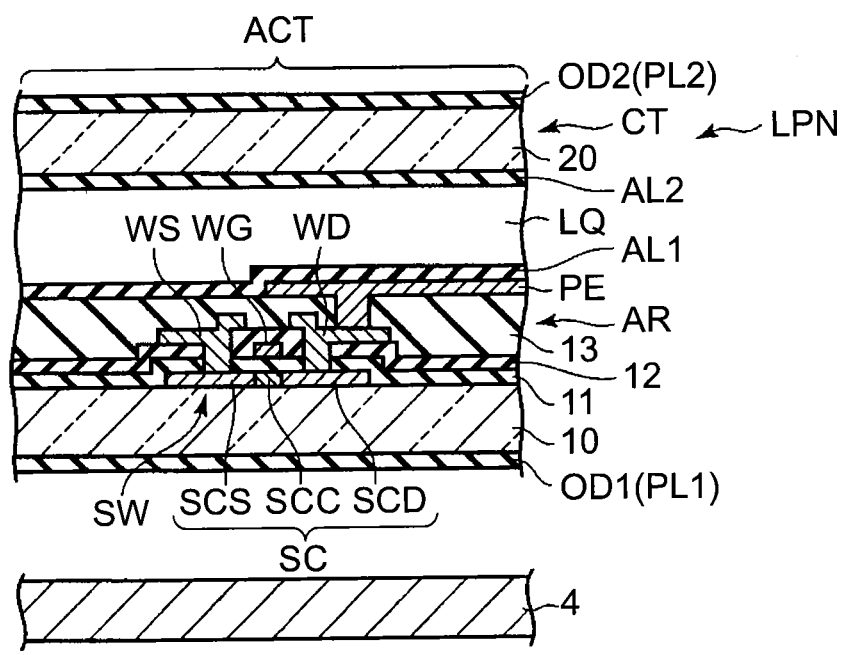
FIG. 3 is a cross-sectional view schematically showing the liquid crystal display panel including a switching element, etc.

FIG. 3 is a view schematically showing the cross-section of the liquid crystal display panel LPN including the switching element SW. In addition, only the portion required for explanation is illustrated here.

The backlight 4 is arranged at the back side of the array substrate AR which constitutes the liquid crystal display panel LPN.

The array substrate AR is formed using an insulating substrate 10 having a light transmissive characteristics, such as a glass substrate and a plastic substrate. This array substrate AR includes the switching element SW, the pixel electrode PE, a first alignment layer AL1, etc., on the side of the first insulating substrate 10 facing the counter substrate CT.

In the example shown here, the switching element SW may be either a top-gate type switching element or a bottom-gate type switching element, and includes a semiconductor layer formed of poly-silicon or amorphous silicon, though the detailed description thereof is not made.

The semiconductor layer SC has a source region SCS and a drain region SCD on both sides which face across a channel region SCC, respectively. In addition, an undercoat layer which is an insulating film may be arranged between the first insulating substrate 10 and the semiconductor layer SC. The semiconductor layer SC is covered with a gate insulating film 11. Moreover, the gate insulating film 11 is arranged also on the first insulating substrate 10.

The gate electrode WG of the switching element SW is formed on the gate insulating film 11, and is located on the channel region SCC of the semiconductor layer SC. The gate line and the auxiliary capacitance line are also formed on the gate insulating film 11. The gate electrode WG, the gate line and the auxiliary capacitance line may be formed using the same material and the same process. The gate electrode WG is electrically connected with the gate line.

The gate electrode WG of the switching element, the gate line and the auxiliary capacitance line are covered with a first interlayer insulating film 12. Moreover, the first interlayer insulating film 12 is arranged also on the gate insulating film 11. The gate insulating layer and 11 and the first interlayer insulating film 12 are formed of an inorganic system material, such as silicon oxide and silicon nitride.

A source electrode WS and a drain electrode WD of the switching element SW are formed on the first interlayer insulating film 12. The source line (not shown) is also formed on the first interlayer insulating film 12. The source electrode WS, the drain electrode WD, and the source lines may be formed using the same process and the same material. The source electrode WS is electrically connected with the source line.

The source electrode WS is in contact with the source region SCS of the semiconductor layer SC through a contact hole which penetrates the gate insulating film 11 and the first interlayer insulating film 12. The drain electrode WD is in contact with the drain region SCD of the semiconductor layer SC through a contact hole which penetrates the gate insulating film 11 and the first interlayer insulating film 12. The gate electrodes WG, the gate lines, the auxiliary capacitance lines, the source electrode WS, the drain electrode WD, and source lines are formed of electric conductive materials, such as molybdenum, aluminum, tungsten, and titanium, for example.

The switching element SW as described above is covered with a second interlayer insulating film 13. That is, the source electrode WS, the drain electrode WD, and the source lines are covered with the second interlayer insulating film 13. Moreover, the second interlayer insulating film 13 is arranged also on the first interlayer insulating film 12. This second interlayer insulating film 13 is formed of various organic materials, such as ultraviolet curing type resin and heat curing type resin, for example.

The pixel electrode PE is formed on the second interlayer insulating film 13. The pixel electrode PE is connected with the drain electrode WD through a contact hole which penetrates the second interlayer insulating film 13. Though the pixel electrode PE is formed by light transmissive conductive materials, such as Indium Tin Oxide (ITO), Indium Zinc Oxide (IZO), etc, other metals such as aluminum may be used.

In addition, the array substrate AR may be equipped with a portion of the common electrode.

A first alignment film AL1 is arranged on a surface of the array substrate AR facing the counter substrate CT, and extends approximately whole region of the active area ACT. The first alignment film AL1 covers the pixel electrode PE, and also formed on the second interlayer insulating film 13. The first alignment film AL1 is formed of the material which shows a lateral alignment characteristics.

On the other hand, the counter substrate CT is formed using a second transmissive insulating substrate 20, such as a glass substrate and a plastic substrate. The counter substrate CT includes the common electrode CE and a second alignment film AL2 on the surface of the second insulating substrate 20 facing the array substrate AR. A black matrix arranged facing wiring portions such as the source line S, the gate line G, the auxiliary capacitance line C, and the switching element SW to define the respective pixels PX, color filter layers arranged corresponding to the pixels PX, and an overcoat layer to smooth the concave and depression of the surface of a black matrix and the color filter layer may be formed on the counter substrate CT.

The common electrode CE is formed of the electric conductive material which has light transmissive characteristics, such as ITO and IZO.

A second alignment film AL2 is arranged on a surface of the counter substrate CT opposing the surface of the array substrate AR, and extends approximately whole of the active area ACT. The second alignment film AL2 covers the common electrodes CE. The second alignment film AL2 is formed materials which have a lateral alignment characteristics An alignment treatment (for example, rubbing treatment and photo alignment treatment) is performed for making the first and second alignment films AL1 and AL2 in an initial alignment state. The direction of the first alignment treatment in which the first alignment film AL1 carries out the initial alignment of the liquid crystal molecule, and the direction of the second alignment treatment in which the second alignment film AL2 carries out the initial alignment of the liquid crystal molecule, are respectively directions in parallel to the second direction Y. The first and second alignment directions are in parallel each other, and same directions or reverse directions each other.

The array substrate AR and the counter substrate CT as mentioned-above are arranged so that the first alignment film AL1 and the second alignment film AL2 face each other. In this case, the pillar-shaped spacer is formed integrally with one of the substrates by resin material between the first alignment film AL1 on the array substrate AR and the second alignment film AL2 on the counter substrate CT. Thereby, a predetermined gap, for example, a 2-7 µm cell gap, is formed, for example. The array substrate AR and the counter substrate CT are pasted together by the seal material which is not illustrated, in which the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted by positive type liquid crystal material.

A first optical element OD1 is attached to the external surface of the array substrate AR, i.e., the external surface of the first insulating substrate 10 which constitutes the array substrate AR by adhesives, etc. The first optical element OD1 contains a first polarizing plate PL1 which has a first polarization axis. Moreover, a second optical element OD2 is attached to the external surface of the counter substrate CT, i.e., the external surface of the second insulating substrate 20 which constitutes the counter substrate CT by adhesives, etc. The second optical element OD2 contains a second polarizing plate PL2 which has a second polarization axis. The first polarization axis of the first polarizing plate PL1 and the second polarization axis of the second polarizing plate PL2 are in a relationship in which they intersect perpendicularly, for example. One polarizing plate is arranged, for example, so that its polarizing direction is the direction of the long axis of the liquid crystal molecule, i.e., the first alignment treatment direction or a parallel direction to the second alignment treatment direction (or in parallel to the second direction Y), or in an orthogonal direction (or in parallel to the first direction X). Thereby, the normally black mode is achieved.

First Embodiment

Figure 4:
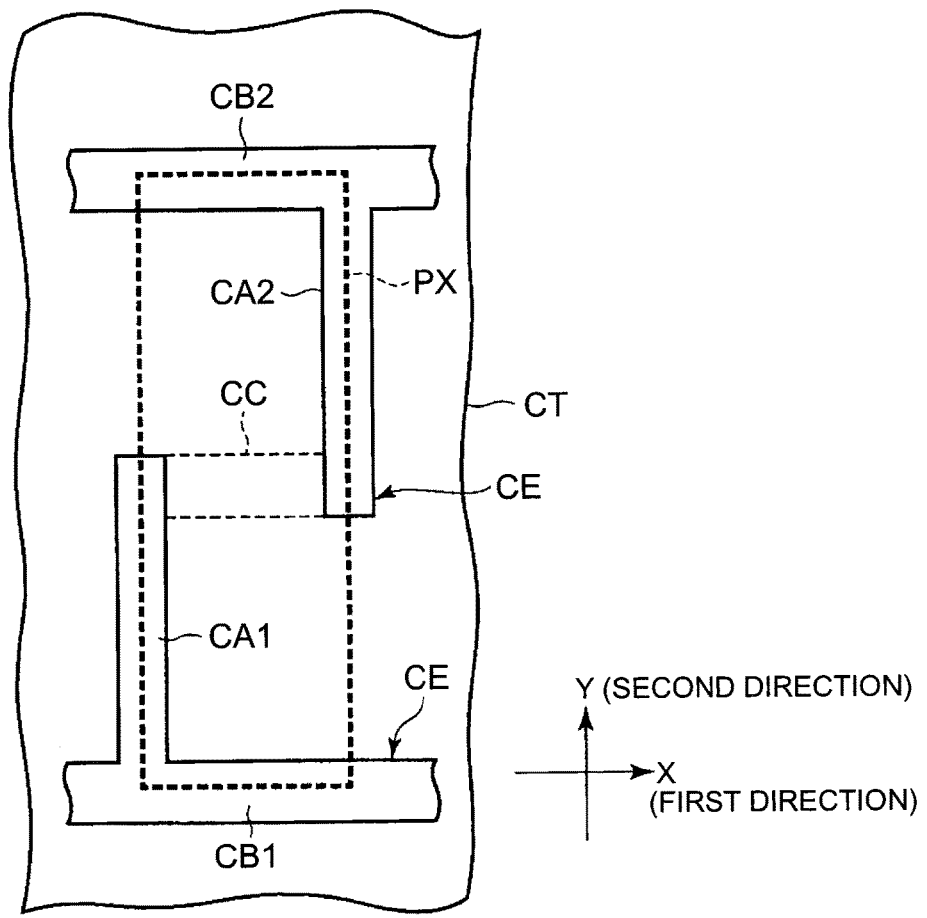
FIG. 4 is a plan view schematically showing a structure of one pixel on a counter substrate constituting the liquid crystal display panel according to a first embodiment.

FIG. 4 is a plan view schematically showing a structure of one pixel on a counter substrate constituting the liquid crystal display panel according to a first embodiment.

In this embodiment, the pixel PX corresponds to a region shown with a dashed line in the figure, and has the shape of a rectangle whose length in the second direction Y is longer than the length in the first direction X. For example, the length in the second direction Y of the pixel PX is about 3 times larger than that in the first direction X.

The counter substrate CT includes the common electrode CE at an side opposing the array substrate which is not illustrated. The common electrode CE includes a first sub-common electrode CB1 and a second sub-common electrode CB2 which extend along the first direction X, and a first main common electrode CA1 and a second main common electrode CA2 extending along the second direction Y.

The first sub-common electrode CB1 and the second sub-common electrode CB2 extend approximately linearly and are formed in a belt shape. In the illustrated example, the first sub-common electrode CB1 is arranged along a bottom end of the pixel PX, and the second sub-common electrode CB2 is arranged along an upper end of the pixel PX. The first sub-common electrode CB1 and the second sub-common electrode CB2 are pulled out to the outside of the active area, and is electrically connected with an electric supply portion formed in the array substrate through an electric conductive component. Thereby, common potential is supplied.

The first main common electrode CA1 and the second main common electrode CA2 extend substantially linearly and are formed in a belt shape. In the illustrated example, the first main common electrode CA1 is arranged along a left-hand side end of the pixel PX, and the second main common electrode CA2 is arranged along a right-hand side end of the pixel PX.

The first main common electrode CA1 is connected with the first sub-common electrode CB1. In the illustrated example, the first main common electrode CA1 is connected with the first sub-common electrode CB1 at the lower left side of the pixel PX, and extends to vicinity of the intermediate portion of the pixel PX along the second direction Y. That is, the length in the second direction Y of the first main common electrode CA1 is approximately half of the length of the pixel PX in the second direction Y. The common electrode CE is not arranged in a region from the intermediate portion of the pixel PX to the second sub-common electrode CB2 on the upper left side. Thus, in one PX, a substantially L character shape is formed with the first main common electrode CA1 and the first sub-common electrode CB1.

The second main common electrode CA2 is connected with the second sub-common electrode CB2. In the illustrated example, the second main common electrode CA2 is connected with the second sub-common electrode CB2 on the upper right side of the pixel PX, and extends to vicinity of the intermediate portion of the pixel PX along the second direction Y. That is, the length in the second direction Y of the second main common electrode CA2 is approximately half of the length in the second direction Y of the pixel PX. The common electrode CE is not arranged in a region from the intermediate portion of the pixel PX to the first sub-common electrode CB1 on the lower right side. Thus, in one PX, a substantially L character shape is formed with the second main common electrode CA2 and the second sub-common electrode CB2.

In addition, the first main common electrode CA1 and the second main common electrode CA2 may be connected by a connection electrode CC extending in the first direction X as shown by a dashed line in the figure. That is, in one PX, the common electrode CE may be formed substantially in the shape of a S character.

Figure 5:
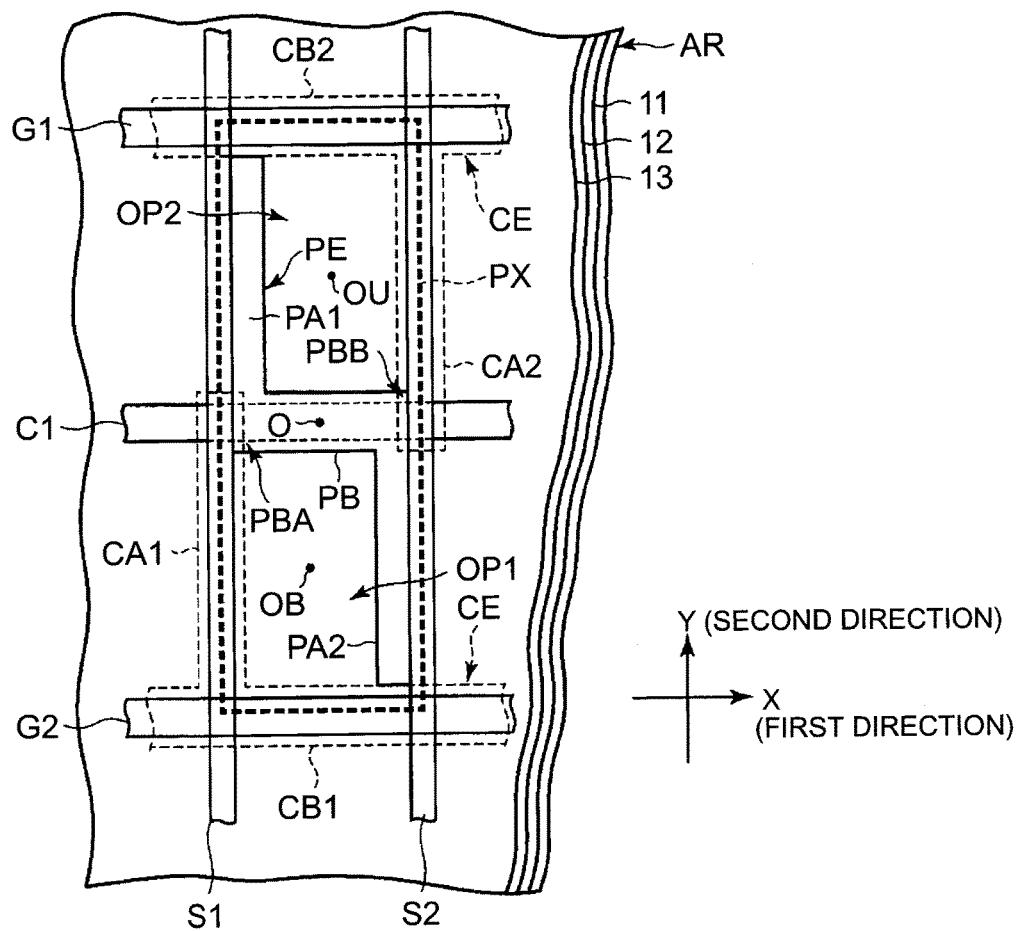
FIG. 5 is a plan view schematically showing a structure of the pixel on an array substrate in the liquid crystal display panel when the pixel is seen from the counter substrate side according to the first embodiment.

FIG. 5 is a plan view schematically showing a structure of the pixel at the array substrate in the liquid crystal display panel when the pixel is seen from the counter substrate side according to the first embodiment. In addition, in order to explain the positional relationship of the pixel electrode PE and the common electrode CE, the common electrode CE is illustrated with a dashed line. Moreover, only composition required for the explanation in one pixel PX is illustrated, and the illustration of the switching element, etc., is omitted.

The array substrate AR includes a gate line G1 and a gate line G2 which extend along the first direction X, an auxiliary capacitance line C1 arranged between the gate line G1 and the gate line G2 extending along the first direction X, a source line S1 and a source line S2 which extend along the second direction Y, and a pixel electrode PE. The auxiliary capacitance line C1, the gate line G1, and the gate line G2 are formed on the gate insulating film 11, and are covered with the first interlayer insulating film 12. The source line S1 and the source line S2 are formed on the first interlayer insulating film 12, and are covered with the second interlayer insulating film 13. The pixel electrode PE is formed on the second interlayer insulating film 13.

In the illustrated example, the source line S1 is arranged on the left-hand side end in the pixel PX. Precisely, the source line S1 is arranged striding over a boundary between the illustrated pixel and a pixel which adjoins the illustrated pixel PX on its left-hand side. The source line S2 is arranged at the right-hand side end in the pixel PX. Precisely, the source line S2 is arranged striding over a boundary between the illustrated pixel and a pixel which adjoins the illustrated pixel PX on its right-hand side. Moreover, in the pixel PX, the gate line G1 is arranged at the upper end portion. Precisely, the gate line G1 is arranged striding over a boundary between the illustrated pixel and a pixel which adjoins the illustrated pixel PX on its upper end side. The gate line G2 is arranged at the lower end portion. Precisely, the gate line G2 is arranged striding over a boundary between the illustrated pixel and a pixel which adjoins the illustrated pixel PX on its lower end side. The auxiliary capacitance line C1 is arranged in the approximately central portion of the pixel PX.

The pixel electrode PE is arranged between the source line S1 and the source line S2. Moreover, the pixel electrode PE is arranged between the gate line G1 and the gate line G2. This pixel electrode PE is electrically connected with the switching element which is not shown. The pixel electrode PE has a sub-pixel electrode PB extending along the first direction X, and a first main pixel electrode PA1 and a second main pixel electrode PA2 extending along the second direction Y. The sub-pixel electrode PB, the first main pixel electrode PA1 and the second main pixel electrode PA2 are electrically connected each other. In the illustrated example, the sub-pixel electrode PB, the first main pixel electrode PA1 and the second main pixel electrode PA2 are integrally or continuously formed.

The sub-pixel electrode PB extends in an approximately straight line, and is formed in a belt shape. In the illustrated example, the sub-pixel electrode PB extends along the first direction X from the left-hand side to the right-hand side of the pixel PX. In the sub-pixel electrode PB, one end PBA is located on the left-hand side of the pixel PX, and the other end PBB is located on the right-hand side of the pixel PX.

In addition, in the illustrated example, one end PBA of the sub-pixel electrode PB does not overlap with the source line S1, and the other end PBB of the sub-pixel electrode PB does not overlap with the source line S2. However, since the second interlayer insulating film 13 is interposed between the source lines S1 and S2 and the sub-pixel electrode PB, one end PBA of the sub-pixel electrode PB may extend on the source line S1, and the other end PBA of the sub-pixel electrode PB may extend on the source line S2.

In the illustrated example, the sub-pixel electrode PB is arranged on the auxiliary capacitance line C1, and functions as a capacitance portion. Between the sub-pixel electrode PB and the auxiliary capacitance line C1, the first interlayer insulating film 12 and the second interlayer insulating film 13 are disposed as insulating films. That is, rather than the position on the adjoining gate line G1 and the gate line G2, the sub-pixel electrode PB is located inside the pixel PX, and is arranged between the gate line G1 and the gate line G2. The sub-pixel electrode PB is arranged approximately in the central portion of the pixel PX, and more specifically, is arranged in the position of approximately middle of the gate line G1 and the gate line G2. In addition, the sub-pixel electrode PB may counter with the gate line. That is, the sub-pixel electrode PB may be arranged on the gate line in a structure in which the gate line is arranged in the approximately central portion of the pixel PX.

The first main pixel electrode PA1 is connected with one end PBA of the sub-pixel electrode PB, and is arranged close to the source line S1. In the illustrated example, the first main pixel electrode PA1 is connected with the sub-pixel electrode PB in the intermediate portion of the pixel PX, and extends to vicinity of the upper left side of the pixel PX along the second direction Y. That is, the first main pixel electrode PA1 extends toward upper portion of the pixel PX from the sub-pixel electrode PB. The length of the first main pixel electrode PA1 in the second direction Y is about half of the length of the pixel PX in the second direction Y. In one end PBA of the sub-pixel electrode PB, the pixel electrode PE is not arranged from the intermediate portion of the pixel PX to the lower left side. In one pixel PX, the shape of a substantially L character is made with the first main pixel electrode PA1 and the sub-pixel electrode PB.

In addition, the first main pixel electrode PA1 overlaps with neither the source line S1 nor the gate line G1 in the illustrated example. However, the second interlayer insulating film 13 is interposed between the source line S1 and the first main pixel electrode PA1, and the first interlayer insulating film 12 and the second interlayer insulating film 13 are interposed between the gate line G1 and the first main pixel electrode PA1. Accordingly, the first main pixel electrode PA1 may extend on the source line S1 or the gate line G1.

The second main pixel electrode PA2 is connected with the other end PBB of the sub-pixel electrode PB, and is arranged close to the source line S2. The second main pixel electrode PA2 extends along the second direction and in a reverse direction of the extending direction of the first main pixel electrode PA1. In the illustrated example, the second main pixel electrode PA2 is connected with the sub-pixel electrode PB in the intermediate portion of the pixel PX, and extends to vicinity of the lower right side of the pixel PX along the second direction Y. That is, the second main pixel electrode PA2 extends toward the lower portion of the pixel PX from the sub-pixel electrode PB along the second direction Y. The length of the second main pixel electrode PA2 in the second direction Y is about half of the length of the pixel PX in the second direction Y. In the other end PBB of the sub-pixel electrode PB, the pixel electrode PE is not arranged from the intermediate portion of the pixel PX to the upper right side. In one pixel PX, the shape of a substantially L character is made with the second main pixel electrode PA2 and the sub-pixel electrode PB.

In addition, the second main pixel electrode PA2 overlaps with neither the source line S2 nor the gate line G2 in the illustrated example. However, the second interlayer insulating film 13 is interposed between the source line S2 and the second main pixel electrode PA2, and the first interlayer insulating film 12 and the second interlayer insulating film 13 are interposed between the gate line G2 and the second main pixel electrode PA2. Accordingly, the second main pixel electrode PA2 may extend on the source line S2 or the gate line G2.

In the illustrated example, the first sub-common electrode CB1 arranged on the counter substrate CT and constituting the common electrode CE is arranged at the bottom end portion of the pixel PX, and counters the gate line G2 as shown with a dashed line. That is, the first sub-common electrode CB1 is arranged striding over a boundary between the illustrated pixel PX and a pixel which adjoins the illustrated pixel PX on the bottom side. That is, the first sub-common electrode CB1 is arranged in common to the pixels adjoining in the second direction Y, or one first sub-common electrode CB1 is arranged between the adjoining pixels.

Similarly, the second sub-common electrode CB2 constituting the common electrode CE is arranged on the upper end portion of the pixel on the counter substrate CT, and counters the gate line G1. That is, the second sub-common electrode CB2 is arranged striding over a boundary between the illustrated pixel and a pixel which adjoins the illustrated pixel PX on the upper side. That is, the second sub-common electrode CB2 is arranged in common to the pixels adjoining in the second direction Y, or one second sub-common electrode CB1 is arranged between the adjoining pixels.

In addition, in case the auxiliary capacitance lines are arranged on the bottom side and the upper side of the pixel PX, the first sub-common electrode CB1 and the second sub-common electrode CB2 may be arranged on the auxiliary capacitance line. Moreover, as shown by a dashed line in FIG. 5, when the first main common electrode CA1 and the second main common electrode CA2 are connected by the connection electrode CC, the connection electrode CC counters with the sub-pixel electrode PB.

Moreover, the first main common electrode CA1 which constitutes the common electrode CE is arranged at the left-hand side end of the pixel PX, and counters a portion of the source line S1. That is, the first main common electrode CA1 is arranged striding over the boundary between the illustrated pixel and a pixel which adjoins the illustrated pixel PX on the left-hand side. That is, the first main common electrode CA1 is arranged in common to the pixel which adjoins in the first direction X, or one first main common electrode CA1 is arranged between the adjoining pixels.

Similarly, the second main common electrode CA2 which constitutes the common electrode CE is arranged at the right-hand side end of the pixel PX, and counters a portion of the source line S2. That is, the second main common electrode CA2 is arranged striding over the boundary between the illustrated pixel and the pixel which adjoins the illustrated pixel PX on the right-hand side. That is, the second main common electrode CA2 is arranged in common to the pixel which adjoins in the first direction X, or one second main common electrode CA2 is arranged between the adjoining pixels.

In the above structure, the first sub-common electrode CB1 and the second sub-common electrode CB2 are arranged on the both sides which sandwich the sub-pixel electrode PB, respectively. That is, the sub-pixel electrode PB is arranged between the first sub-common electrode CB1 and the second sub-common electrode CB2. More specifically, one sub-pixel electrode PB is located between the first sub-common electrode CB1 and the second sub-common electrode CB2. That is, the first sub-common electrode CB1, the sub-pixel electrode PB, and the second sub-common electrode CB2 are arranged along the second direction Y in this order. The first sub-common electrode CB1, the sub-pixel electrode PB, and the second sub-common electrode CB2 are arranged approximately in parallel. At this time, in a X-Y plane, neither the first sub-common electrode CB1 nor the second sub-common electrode CB2 overlaps with the sub-pixel electrode PB. The distance between the first sub-common electrode CB1 and the sub-pixel electrode PB in the second direction Y is substantially the same as that between the second sub-common electrode CB2 and the sub-pixel electrode PB.

Moreover, the first main common electrode CA1 extends in a reverse direction of the extending direction of the first main pixel electrode PA1 along the second direction Y on one end PBA side of the sub-pixel electrode PB. That is, while the first main pixel electrode PA1 extends toward the upper portion of the pixel PX from one end PBA of the sub-pixel electrode PB, the first main common electrode CA1 extends toward the bottom portion of the pixel PX from one end PBA of the sub-pixel electrode PB and connected with the first sub-common electrode CB1. The first main common electrode CA1 and the second main pixel electrode PA2 are arranged mutually in parallel. At this time, the first main common electrode CA1 does not overlap with the second main pixel electrode PA2 in the X-Y plane.

Similarly, the second main common electrode CA2 extends in a reverse direction of the extending direction of the second main pixel electrode PA2 along the second direction Y on the other end PBB side of the sub-pixel electrode PB. That is, while the second main pixel electrode PA2 extends toward the lower portion of the pixel PX from the other end PBB of the sub-pixel electrode PB, the second main common electrode CA2 extends toward the upper portion of the pixel PX from the other end PBB of the sub-pixel electrode PB and connected with the second sub-common electrode CB2. The second main common electrode CA2 and the first main pixel electrode PA1 are arranged mutually in parallel. At this time, the second main common electrode CA2 does not overlap with the first main pixel electrode PA1 in the X-Y plane. The distance between the first main common electrode CA1 and the second main pixel electrode PA2 is approximately the same as that between the second main common electrode CA2 and the first main pixel electrode PA1 in the first direction X.

In the illustrated example, each of the pixel electrode PE and the common electrode CE is formed so as to be symmetry with reference to a center point O of the pixel PX.

In the bottom half of the pixel, a first aperture OP1 is formed by being surrounded with a L character shape common electrode CE and a L character shape pixel electrode PE. The L character shape common electrode CE is formed with the first main common electrode CA1 and the first sub-common electrode CB1. The L character shape pixel electrode PE is formed with the second main pixel electrode PA2 and the sub-pixel electrode PB. The first main common electrode CA1 and the first sub-common electrode CB1 of the L character shape, and the second main pixel electrode PA2 and the sub-pixel electrode PB of the L character shape are respectively symmetry with reference to a central point OB of the first aperture.

In the upper half of the pixel, a second aperture OP2 is formed by being surrounded with a L character shape common electrode CE and a L character shape pixel electrode PE. The L character shape common electrode CE is formed with the second main common electrode CA2 and the second sub-common electrode CB2. The L character shape pixel electrode PE is formed with the second main pixel electrode PA1 and the sub-pixel electrode PB. The second main common electrode CA2 and the second sub-common electrode CB2 of the L character shape, and the first main pixel electrode PA1 and the sub-pixel electrode PB of the L character are symmetry with reference to the central point OU of the second aperture, respectively.

In one pixel PX, the area of the first aperture OP1 in the bottom half and the area of the second aperture OP2 in the upper half are approximately the same.

Figure 6:
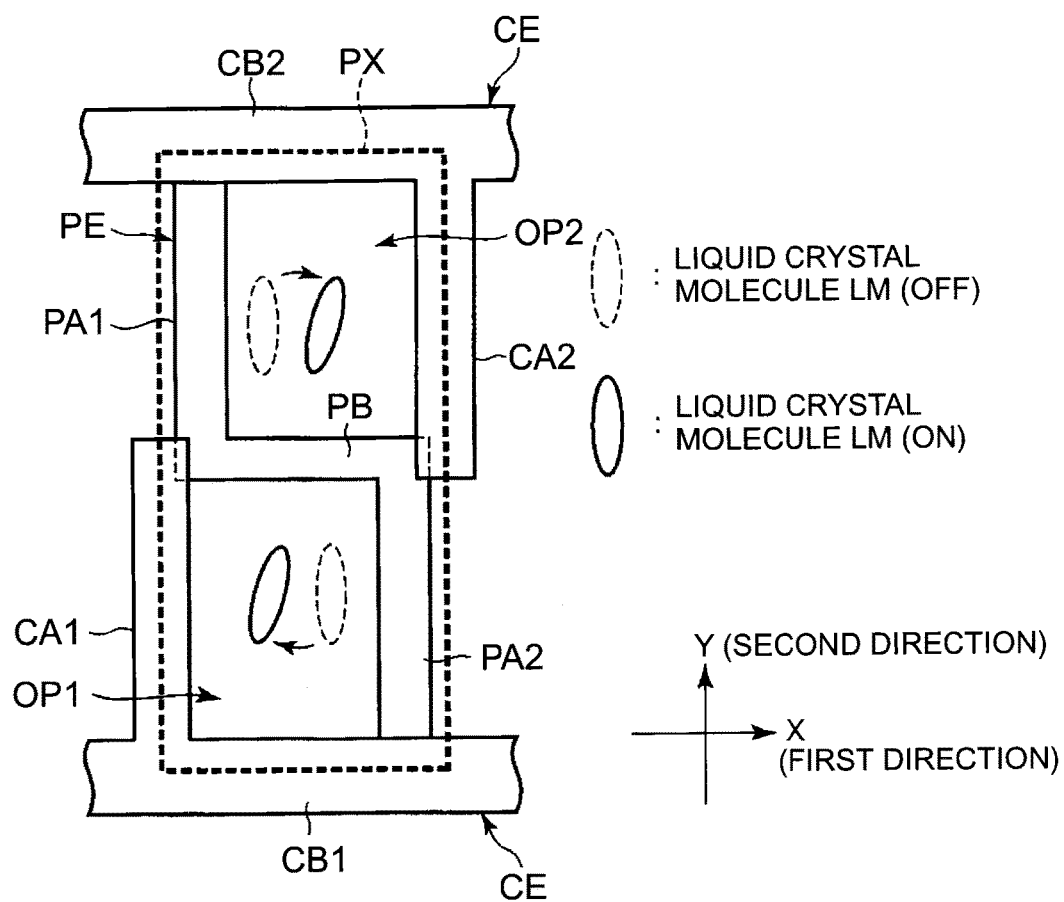
FIG. 6 is a plan view of one pixel showing an operation of the liquid crystal display panel according to the first embodiment.

FIG. 6 is a plan view of one pixel showing an operation of the liquid crystal display panel according to the first embodiment.

At the time of non-electric field state, i.e., when a potential difference (i.e., electric field) is not formed between the pixel electrode PE and the common electrode CE, the liquid crystal molecules LM of the liquid crystal layer LQ are aligned so that their long axis are aligned in a parallel direction with the first alignment direction of the first alignment film AL1 and the second alignment direction of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with a X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with the X-Y plane, and is explained as what rotates in a field in parallel with the X-Y plane.

Here, both of the first alignment treatment direction of the first alignment film AL1 and the second alignment treatment direction of the second alignment film AL2 are directions in parallel to the first direction Y. At the time of OFF, the long axis of the liquid crystal molecule LM is aligned substantially in parallel to the second direction Y as shown with a dashed line in the figure. That is, the direction of the initial alignment of the liquid crystal molecule LM is in parallel to the second direction Y.

In addition, when both of the first and second alignment treatment directions are in parallel, and are reverse directions each other, the liquid crystal molecule LM is aligned so that the liquid crystal molecule LM is aligned with an approximately same pre-tilt angle near the first and second alignment films AL1 and AL2 and in the intermediate portion of the liquid crystal layer LQ (homogeneous alignment). In addition, when the respective directions of the alignment treatment of the first alignment film AL1 and the second alignment film AL2 are in parallel, and are same directions each other, the liquid crystal molecule LM is aligned with approximately horizontal direction (i.e., the pre tilt angle is approximately zero) in a cross-section of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment).

A portion of the back light from the backlight 4 enters into the liquid crystal display panel LPN after penetrating the first polarizing plate PL1. The polarization state of the light which enters into the liquid crystal display panel LPN changes depending on the alignment state of the liquid crystal molecule LM when the light passes the liquid crystal layer LQ. At the time of OFF, the light which passes the liquid crystal layer LQ is absorbed by the second polarizing plate PL2 (black display).

On the other hand, in case where the potential difference is formed between the pixel electrode PE and the common electrode CE (at the time of ON), the lateral electric field in parallel to the substrate (or oblique electric field) is formed between the pixel electrode PE and the common electrode CE Thereby, the liquid crystal molecule LM rotates within a parallel plane with the substrate surface so that the long axis becomes in parallel with the direction of the electric field as shown in the dashed line in FIG. 6.

In the embodiment shown in FIG. 6, one pixel PX is divided into two regions (i.e., first aperture OP1 and second aperture OP2) with the pixel electrode PE and the common electrode CE. That is, the liquid crystal molecule LM in the region of the first aperture OP1 rotates clockwise with respect to the second direction Y, and is aligned so that the long axis turns to the lower left in the figure along with electric field. Moreover, the liquid crystal molecule LM in the region of the second aperture OP2 rotates clockwise with respect to the second direction Y, and is aligned so that the long axis turns to the upper right in the figure along with electric field.

Thus, in each pixel PX, when the horizontal electric field is formed between the pixel electrode PE and the common electrode CE, the alignment direction of the liquid crystal molecule LM is divided into at least two groups of directions, and two domains are formed corresponding to respective alignment directions. That is, at least two domains are formed in each pixel PX.

At the time of ON, the light which entered into the liquid crystal panel LPN from the backlight 4 enters into the liquid crystal layer LQ. When the back light which entered into the liquid crystal layer LQ passes through the first aperture OP1 and the second aperture OP2 divided with the pixel electrode PE and the common electrode CE, respectively, the polarization state changes. At the time of ON, at least a portion of light which passed the liquid crystal layer LQ penetrates the second polarizing plate PL2 (white display).

According to this embodiment, it becomes possible to form at least two domains. Therefore, the viewing angle in at least two directions can be compensated optically, and a wide viewing angle is attained while becoming possible to suppress the generation of gradation reversal. Furthermore, it is possible to form two or more domains in one pixel without providing other electrodes by arranging the pixel electrode and the common electrode at the both-end sides which sandwich the aperture of the pixel PX, respectively. Therefore, the shortening of the length of the pixel pitch or the shortening of the length of the pixel in the first direction X and the second direction Y is possible, and a high resolution pixel can be realized.

Moreover, when assembling shift occurs between the array substrate AR and the counter substrate CT, a difference from a designed value may arise in distances between the respective common electrodes CE and the pixel electrode PE. However, since the alignment shift is produced in common to all the pixels PX, there is no difference in the electric field distribution between the pixels PX, and also no difference in the areas of the apertures among the respective pixels. Thereby, the influence to the displayed image is negligible, and it becomes possible to suppress the variation of the transmissivity due to the assembling shift.

Accordingly, a high quality liquid crystal display device can be supplied.

Furthermore, at the time of ON, since the lateral electric field is hardly formed (or sufficient electric field to drive the liquid crystal molecule LM is not formed) near the pixel electrode PE and the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, the backlight hardly penetrates, i.e., hardly contributes to the display at the time of ON. Therefore, the pixel electrode PE and the common electrode CE do not necessarily need to be formed of a transparent electric conductive material, and may be formed using electric conductive materials, such as aluminum and silver.

Next, the example of a layout is explained according to the first embodiment.

Figure 7:
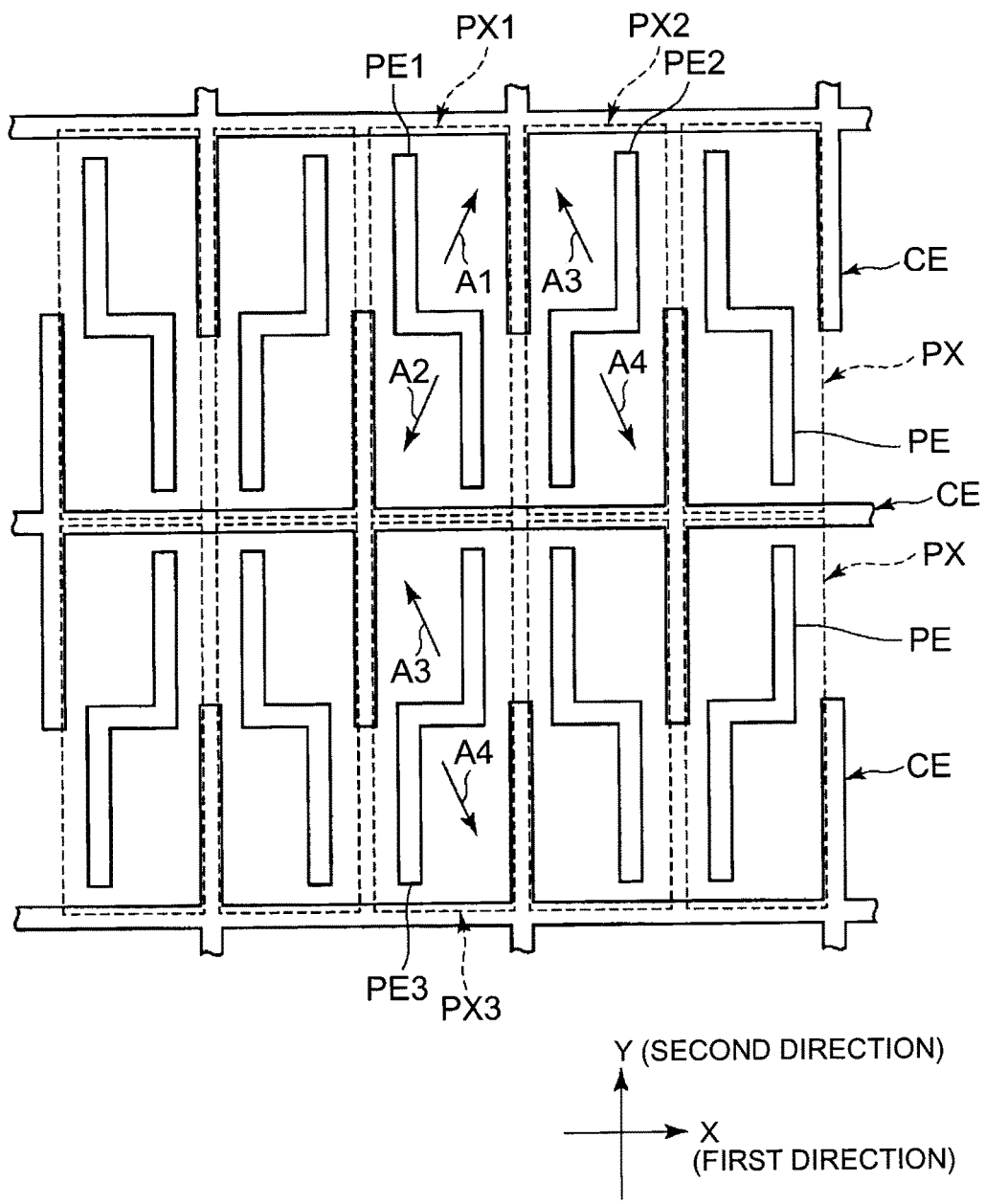
FIG. 7 is a figure schematically showing an example of a layout of an active area according to the first embodiment.

FIG. 7 is a figure schematically showing an example of the layout of the active area according to the first embodiment. Herein, only composition required for explanation is illustrated here.

First, when its attention is paid to the shape of the pixel electrode PE of each pixel PX, each pixel electrode PE of two pixels PX which adjoin in the first direction X is line symmetry with respect to a boundary between the pixels. In the illustrated example, the shape of the first pixel electrode PE of a first pixel PX1 is the same as shown in FIG. 5, etc. The shape of the second pixel electrode PE of the second pixel PX2 which adjoins on the right-hand side of the first pixel PX1 is line symmetry with reference to a boundary between the first pixel PX1 and the second pixel PX2. In addition, the shape of the pixel electrode of the pixel which adjoins on the left-hand side of the first pixel PX1 is the same as the second pixel electrode PE2. That is, the left-light directions of the pixel electrode PE are alternately reversed every pixel PX located in a line in the first direction X.

In addition, each pixel electrode PE of two pixels PX which adjoin in the second direction Y is line symmetry with respect to a boundary between pixels. In the illustrated example, the third pixel electrode PE3 of the third pixel PX3 arranged adjacent to the first pixel PX1 on the lower side is line symmetry with reference to a boundary between first pixel PX1 and third pixel PX3 and has same shape as the second pixel electrode PE2 of the second pixel PX2. Though not illustrated, the shape of the pixel electrode adjoining on the upper side of the first pixel PX1 is also same as that of the second pixel electrode PE2. That is, the upper-lower directions of the pixel electrode PE are alternately reversed every pixel PX located in a line in the second direction Y.

The common electrode CE is arranged along a boundary between adjacent pixels PX, and includes a L character shape portion which faces the L character portion of the pixel electrode PE.

In this layout, at the time of ON when the direction of the initial alignment of the liquid crystal molecule LM is set up in the second direction Y, and potential difference is formed between the pixel electrode PE and the common electrode CE of each pixel PX, for example, the long axis of the liquid crystal molecule LM turns to the direction of the upper right shown by an arrow A1 in the upper half of the first pixel PX1. In the lower half of the first pixel PX1, the long axis of the liquid crystal molecule LM turns to the direction of the lower left shown by an arrow A2. In the upper half of second pixel PX2, the long axis of the liquid crystal molecule LM turns to the direction of the upper left shown by an arrow A3. The long axis of the liquid crystal molecule LM turns to the direction of the lower right shown by an arrow A4 in the lower half of the second pixel PX2. The same thing can be said also between first pixel PX1 and the third pixel PX3. That is, in two adjoining pixels PX, it becomes possible to form four domains. In the layout for a high definition display, since substantially same voltages are written into the adjacent two pixels PX, it becomes possible to compensate the viewing angle in four directions optically by the two pixels PX.

Figure 8:
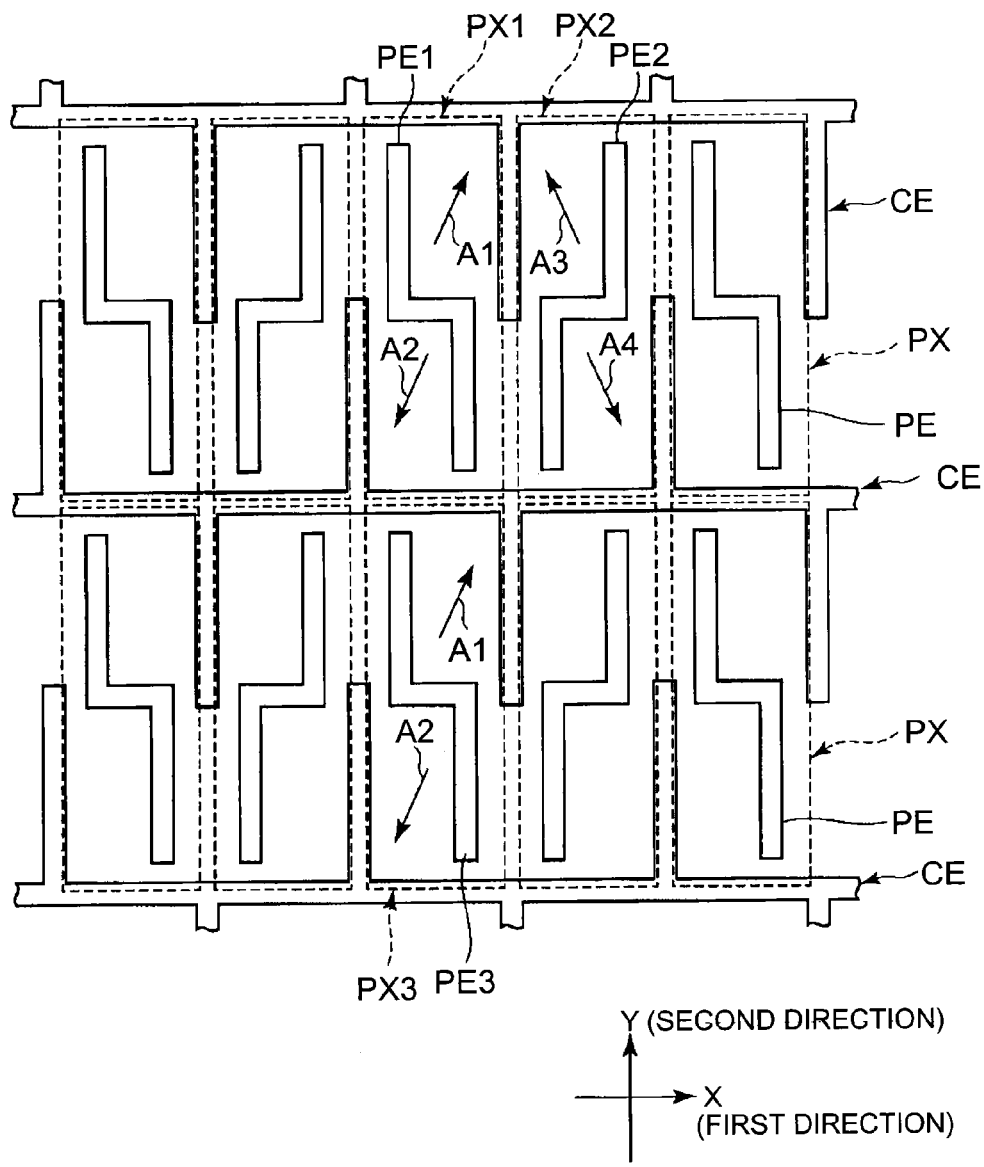
FIG. 8 is a figure schematically showing a modification of the layout of the active area according to the first embodiment.

FIG. 8 is a figure schematically showing a modification of the layout of the active area according to the first embodiment. Herein, only composition required for explanation is illustrated here.

The layout of the pixel electrode PE of each pixel PX shown in FIG. 8 is different compared with the layout shown in FIG. 7 in that each pixel electrode PE of the pixel PX which adjoins in the second direction Y has the same shape.

In the illustrated example, the shape of the second pixel electrode PE2 of the second pixel PX2 which adjoins the first pixel PX1 on the right-hand side is line symmetry with a boundary between first pixel PX1 and the second pixel PX2. The shape of the pixel electrode which adjoins the pixel electrode PE1 of the first pixel PX1 on the left-hand side is the same as the second pixel electrode PE2. Moreover, the shape of the third pixel electrode PE3 of the third pixel PX3 which adjoins the first pixel PX1 on the lower side is the same shape as the first pixel electrode PE1, and although not illustrated, the shape of the pixel electrode of the pixel which adjoins the first pixel PX1 on the upper side is the same as the first pixel electrode PE1. That is, the shape of the pixel electrode PE of each pixel PX located in a line in the second direction Y is the same altogether.

The common electrode CE is arranged along a boundary between adjacent pixels PX, and includes a L character shape portion which faces the L character portion of the pixel electrode PE.

Also in the above layout, at the time of ON when the direction of the initial alignment of the liquid crystal molecule LM is set up in the second direction Y, and potential difference is formed between the pixel electrode PE and the common electrode CE of each pixel PX, for example, in the upper half of the first pixel PX1, the long axis of the liquid crystal molecule LM turns to the direction of the upper right shown by an arrow A1. In the lower half of the first pixel PX1, the long axis of the liquid crystal molecule LM turns to the direction of the lower left shown by an arrow A2. In the upper half of the second pixel PX2, the long axis of the liquid crystal molecule LM turns to the direction of the upper left shown by an arrow A3, and the long axis of the liquid crystal molecule LM turns to the direction of the lower right shown by an arrow A4 in the bottom half of second pixel PX2. That is, it becomes possible to form four domains in two pixels PX which adjoin in the first direction X.

Second Embodiment

Figure 9:
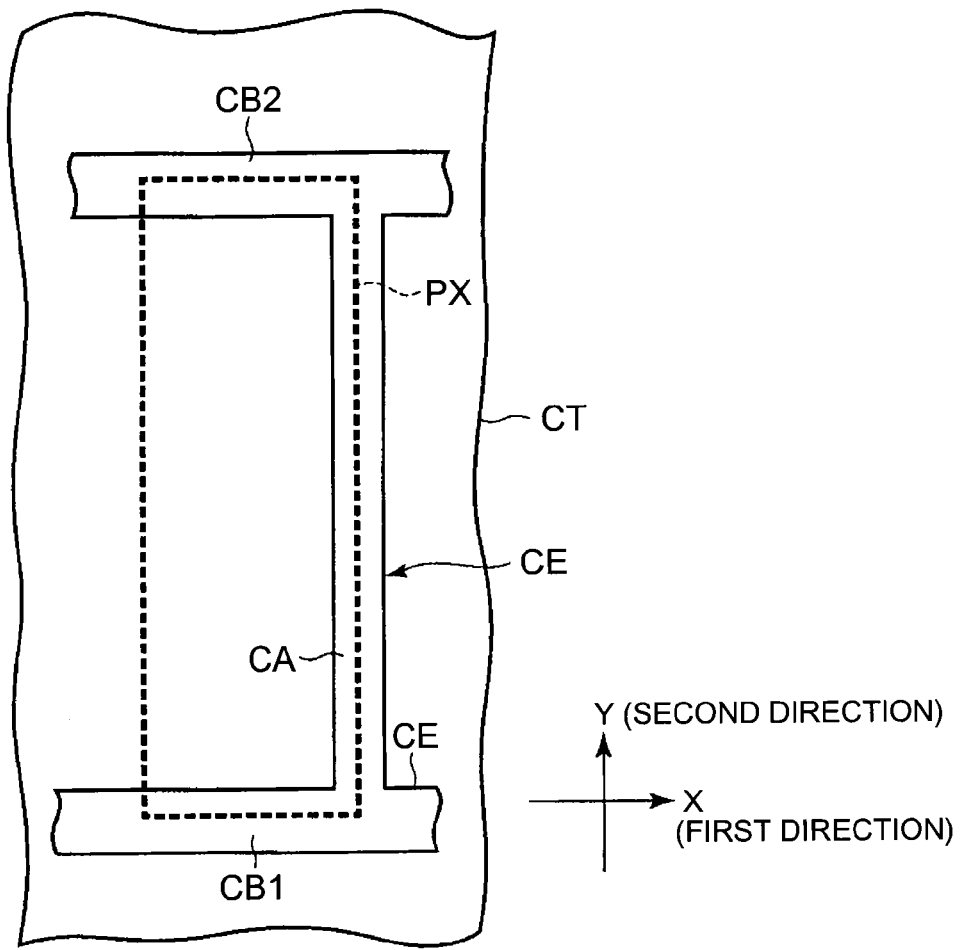
FIG. 9 is a plan view schematically showing the structure of one pixel on the counter substrate constituting the liquid crystal display panel according to a second embodiment.

FIG. 9 is a plan view schematically showing a structure of one pixel on a counter substrate constituting the liquid crystal display panel according to a second embodiment. In the illustrated example, the pixel PX corresponds to a region shown with a dashed line in the figure like the first embodiment, and has the shape of a rectangle whose length in the second direction Y is longer than the length in the first direction X. For example, the length in the second direction Y of the pixel PX is about 3 times larger than that in the first direction X.

The counter substrate CT includes a common electrode CE opposing the array substrate which is not illustrated. The common electrode CE includes a first sub-common electrode CB1 and a second sub-common electrode CB2 which extend along the first direction X, and a main common electrode CA along the second direction Y.

The structures of the first sub-common electrode CB1 and the second sub-common electrode CB2 are the same as those of the first embodiment.

The main common electrode CA extends in approximately straight line, and is formed in a belt shape. In the illustrated example, the main common electrode CA is arranged along the right-hand side of the pixel PX. The main common electrode CA is connected with the first sub-common electrode CB1 and the second sub-common electrode CB2. In the illustrated example, the main common electrode CA is connected with the first sub-common electrode CB1 on the lower right side of the pixel PX. The main common electrode CA is also connected with the second sub-common electrode CB2 on the upper right side of the pixel PX. In addition, the common electrode CE is not arranged on the left-hand side of the pixel PX.

The main common electrode CA and first sub-common electrode CB1 make a shape of L character. Moreover, the main common electrode CA and the second sub-common electrode CB2 also make a shape of L character. The main common electrode CA, the first sub-common electrode CB1 and the second sub-common electrode CB2 make a U character shape in one pixel PX.

Figure 10:
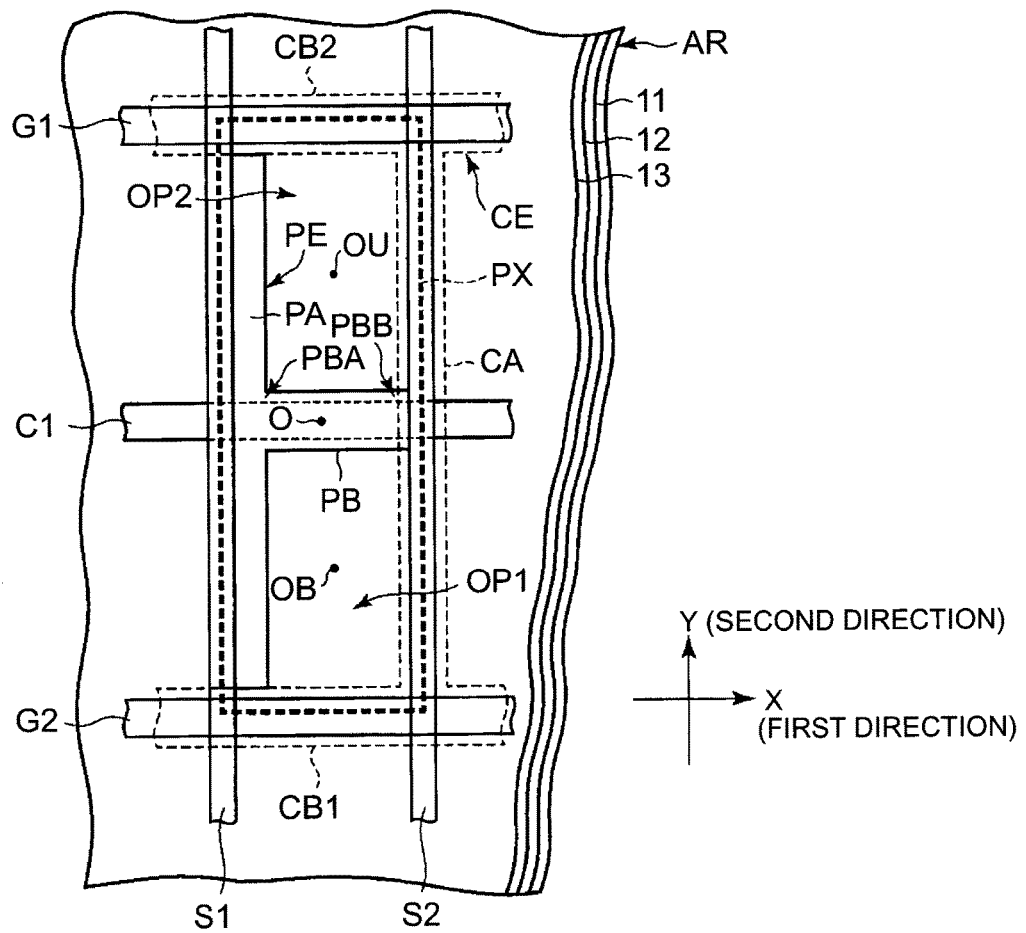
FIG. 10 is a plan view schematically showing a structure of the pixel on the array substrate in the liquid crystal display panel when the pixel is seen from the counter substrate side according to the second embodiment.

FIG. 10 is a plan view schematically showing a structure of the pixel on the array substrate in the liquid crystal display panel when the pixel is seen from the counter substrate side according to the second embodiment. In addition, in order to explain the positional relationship between the pixel electrode PE and the common electrode CE, the common electrode CE is illustrated with a dashed line. Moreover, only composition required for the explanation in the pixel PX is illustrated, and the illustration of a switching element, etc., is omitted.

The array substrate AR is equipped with a gate line G1 and a gate line G2, the auxiliary capacitance line C1, the source line S1 and the source line S2, and the pixel electrode PE like the first embodiment. In this second embodiment, the shape of the pixel electrode PE is different as compared with the first embodiment. The pixel electrode PE has the sub-pixel electrode PB which extends along the first direction X and the main pixel electrode PA which extends along the second direction Y. The sub-pixel electrodes PB and the main pixel electrode PA are electrically connected. In the illustrated example, the sub-pixel electrode PB and the main pixel electrode PA are integrally or continuously formed.

The sub-pixel electrode PB extends in an approximately line shape, and is formed in a belt shape. In this embodiment, the sub-pixel electrode PB extends along the first direction X from the left-hand side end to the right-hand side end of the pixel PX. In the sub-pixel electrode PB, one end PBA is located on the left-hand side of the pixel PX, and the other end PBB is located on the right-hand side of the pixel PX.

In the illustrated example, one end PBA of the sub-pixel electrode PB does not overlap with the source line S1, and the other end PBB of the sub-pixel electrode PB does not overlap with the source line S2. However, since the second interlayer insulating film 13 is interposed between the source lines S1 and S2 and the sub-pixel electrode PB, one end PBA of the sub-pixel electrode PB may extend on the source line S1, and the other end PBA of the sub-pixel electrode PB also may extend on the source line S2.

Moreover, in the illustrated example, the sub-pixel electrode PB is arranged on the auxiliary capacitance line C1, and functions as a capacitance portion. Between the sub-pixel electrode PB and the auxiliary capacitance line C1, the first interlayer insulating film 12 and the second interlayer insulating film 13 are interposed as insulating films. The sub-pixel electrode PB is located inside the pixel PX rather than the respective positions on the adjoining gate line G1 and the gate line G2, and is arranged between the gate line G1 and the gate line G2. The sub-pixel electrode PB is arranged in the approximately central portion of the pixel PX, and, more specifically, is arranged in the position of approximately middle between the gate line G1 and the gate line G2. In addition, the sub-pixel electrode PB may counter with the gate line in a structure in which the gate line is arranged in the approximately central portion of the pixel PX.

The main pixel electrode PA is connected with one end PBA of the sub-pixel electrode PB at the intermediate portion, and arranged close to the source line S1. In the illustrated example, the main pixel electrode PA extends from near the lower left side to near the upper left side of the pixel PX along the second direction Y. The main pixel electrode PA is connected with the sub-pixel electrode PB in the intermediate portion of the main pixel electrode PA. That is, the main pixel electrode PA extends toward the both sides of the sub-pixel electrode PB. The length of the main electrode PA in the second direction Y is substantially the same as that of the pixel PX. The main pixel electrode is not arranged on the other end PBB side of the sub-pixel electrode PB.

In one pixel PX, the shape of T character is made with the main pixel electrode PA and the sub-pixel electrode PB. In addition, on both sides of the sub-pixel electrode PB, the shape of L character is made with the main pixel electrode PA and the sub-pixel electrode PB on the lower side of the pixel PX, and similarly, the shape of L character is similarly made with the main pixel electrode PA and the sub-pixel electrode PB on the upper side of the pixel PX.

In the illustrated example, the main pixel electrode PA overlap with neither the source line nor the gate lines G1 and G2 However, since the second interlayer insulating film 13 is interposed between the source line S1 and the main pixel electrode PA, and further, between the gate lines G1 and G2 and the main pixel electrode PA, the first interlayer insulating film 12 and the second interlayer insulating film 13 are interposed, a portion of the main pixel electrodes PA may extend on the source line S1 or the gate lines G1 and G2.

In the illustrated example, the first sub-common electrode CB1 formed on the counter substrate CT and constituting the common electrode CE is arranged at the bottom portion of the pixel PX like the first embodiment, and faces the gate line G2 as shown with the dashed line. The second sub-common electrode CB2 is arranged at the upper portion of the pixel PX, and counters the gate line G1.

Moreover, the main common electrode CA which constitutes the common electrode CE is arranged at the right-hand side end of the pixel PX, and counters a portion of the source line S2. That is, the main common electrode CA is arranged striding over a boundary between the illustrated pixel PX and the pixel which adjoins the illustrated pixel PX on the right-hand side. That is, the main common electrode CA is arranged between the adjoining pixels in common to the pixel which adjoins in the first direction X, i.e., the pixel PX on the right-hand side. One main common electrode CA is arranged between the adjacent pixels.

In this embodiment, the first sub-common electrode CB1 and the second sub-common electrode CB2 are arranged on the both sides of the sub-pixel electrode PB, respectively. That is, the sub-pixel electrode PB is arranged between the first sub-common electrode CB1 and the second sub-common electrode CB2. More specifically, one sub-pixel electrode PB is located between the first sub-common electrode CB1 and the second sub-common electrode CB2. That is, the first sub-common electrode CB1, the sub-pixel electrode PB, and the second sub-common electrode CB2 are arranged along the second direction Y in this order. The first sub-common electrode CB1, the sub-pixel electrode PB, and the second sub-common electrode CB2 are arranged in parallel each other. At this time, in the X-Y plane, neither the first sub-common electrode CB1 nor the second sub-common electrode CB2 overlaps with the sub-pixel electrode PB. The distance between the first sub-common electrode CB1 and the sub-pixel electrode PB in the second direction Y is substantially same as that between the second sub-common electrode CB2 and the sub-pixel electrode PB.

The main common electrode CA extends along the second direction Y on the other end PBB side of the sub-pixel electrode PB. That is, while the main pixel electrode PA extends along the second direction Y from the bottom portion to the upper portion of the pixel PX on one end PBA side of the sub-pixel electrode PB and is connected with the sub-pixel electrode PB, the main common electrode CA extends from bottom portion to the upper portion of the pixel PX in the second direction Y on the other end PBB side of the sub-pixel electrode PB, and is connected with the first sub-common electrode CB1 and the second sub-common electrode CB2. The main common electrode CA and the main pixel electrode PA are arranged approximately in parallel. At this time, the main common electrode CA does not overlap with the main pixel electrode PA in the X-Y plane.

In the bottom half of the pixel, a first aperture OP1 is formed by being surrounded with a L character shape common electrode CE and a L character shape pixel electrode PE. The L character shape common electrode CE is formed with the first main common electrode CA and the first sub-common electrode CB1. The L character shape pixel electrode PE is formed with the main pixel electrode PA and the sub-pixel electrode PB. The first main common electrode CA and the first sub-common electrode CB1 of the L character shape, and the main pixel electrode PA and the sub-pixel electrode PB of the L character shape are point symmetry with reference to the central point OB of a first aperture OP1, respectively.

In the upper half of the pixel, a second aperture OP2 is formed by being surrounded with a L character shape common electrode CE and a L character shape pixel electrode PE. The L character shape common electrode CE is formed with the main common electrode CA and the second sub-common electrode CB2. The L character shape pixel electrode PE is formed with the main pixel electrode PA and the sub-pixel electrode PB. The main common electrode CA and the second sub-common electrode CB2 of the L character shape, and the main pixel electrode PA and the sub-pixel electrode PB of the L character shape is point symmetry with reference to the central point OU of a second aperture OP2, respectively.

In one pixel PX, the area of the first aperture OP1 of the bottom half portion and the area of the second aperture OP2 of the upper half portion are approximately the same.

Figure 11:
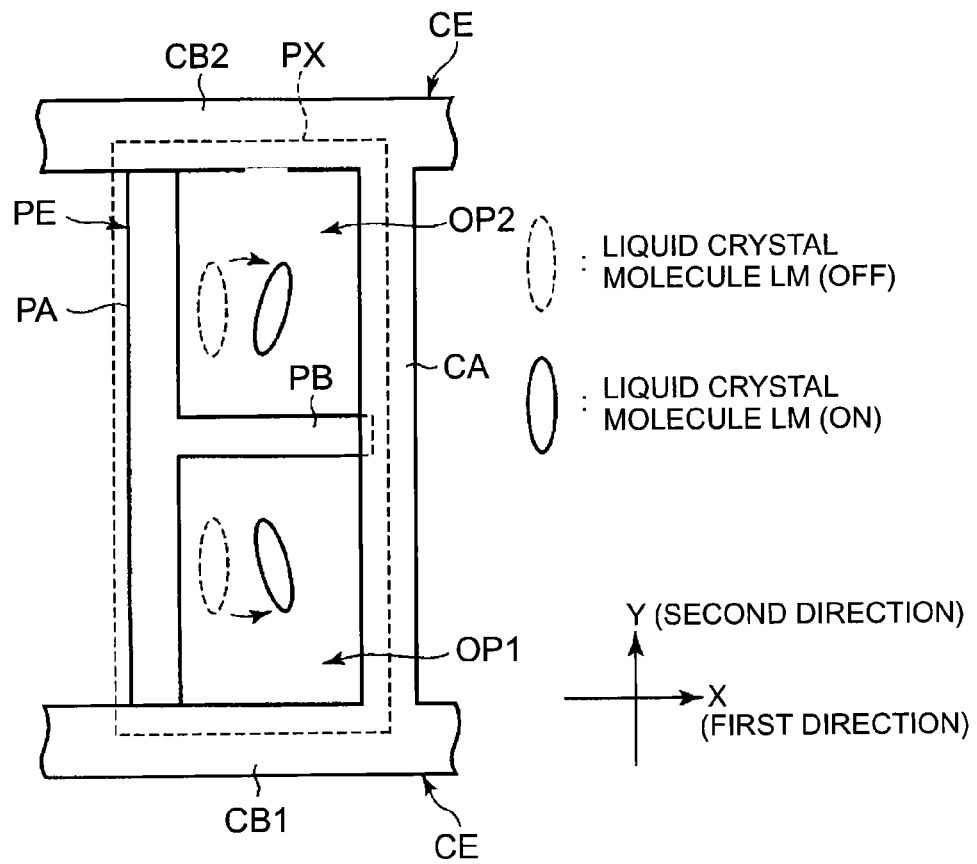
FIG. 11 is a plan view of one pixel showing an operation of the liquid crystal display panel according to the second embodiment.

FIG. 11 is a plan view of one pixel showing an operation of the liquid crystal display panel according to the second embodiment.

At the time of OFF, like the first embodiment, the liquid crystal molecule LM of the liquid crystal layer LQ aligns so that the long axis of the liquid crystal molecule may turn to the first alignment treatment direction of the first alignment film AL1 and the second alignment treatment direction of the second alignment film AL2 shown with a dashed line in the figure, herein, in a substantially parallel direction to the second direction Y. At this OFF time, the black images are displayed.

At the time of ON in which potential difference is formed between the pixel electrode PE and the common electrode CE, lateral electric field in parallel to the substrate or oblique electric field is formed between the pixel electrode PE and the common electrodes CE. Thereby, the liquid crystal molecule LM rotates within the parallel plane to the substrate so that the long axis aligns with the direction of electric field as shown with a dashed line in the figure.

In this embodiment, one pixel PX is divided into two domains (i.e., first aperture OP1 and second aperture OP2) defined by the pixel electrode PE and the common electrode CE. That is, the liquid crystal molecule LM in the domain of the first aperture OP1 rotates counterclockwise with reference to the second direction Y so that the long axis may turn to the lower right side in the figure along with electric field. Moreover, the liquid crystal molecule LM in the domain of the second aperture OP2 rotates clockwise with reference to the second direction Y so that the long axis may turn to the upper right side in the figure along with the electric field.

Thus, in each pixel PX, when the lateral electric field or the oblique electric field is formed between the pixel electrode PE and the common electrode CE, the alignment direction of the liquid crystal molecule LM is divided into at least two groups of directions, and two domains are formed corresponding to respective alignment directions. That is, at least two domains are formed in each pixel PX. At the time of ON, white image is displayed.

According to the second embodiment, the same effect as the first embodiment is acquired.

Next, one example of the layout is explained about the above-mentioned second embodiment.

Figure 12:
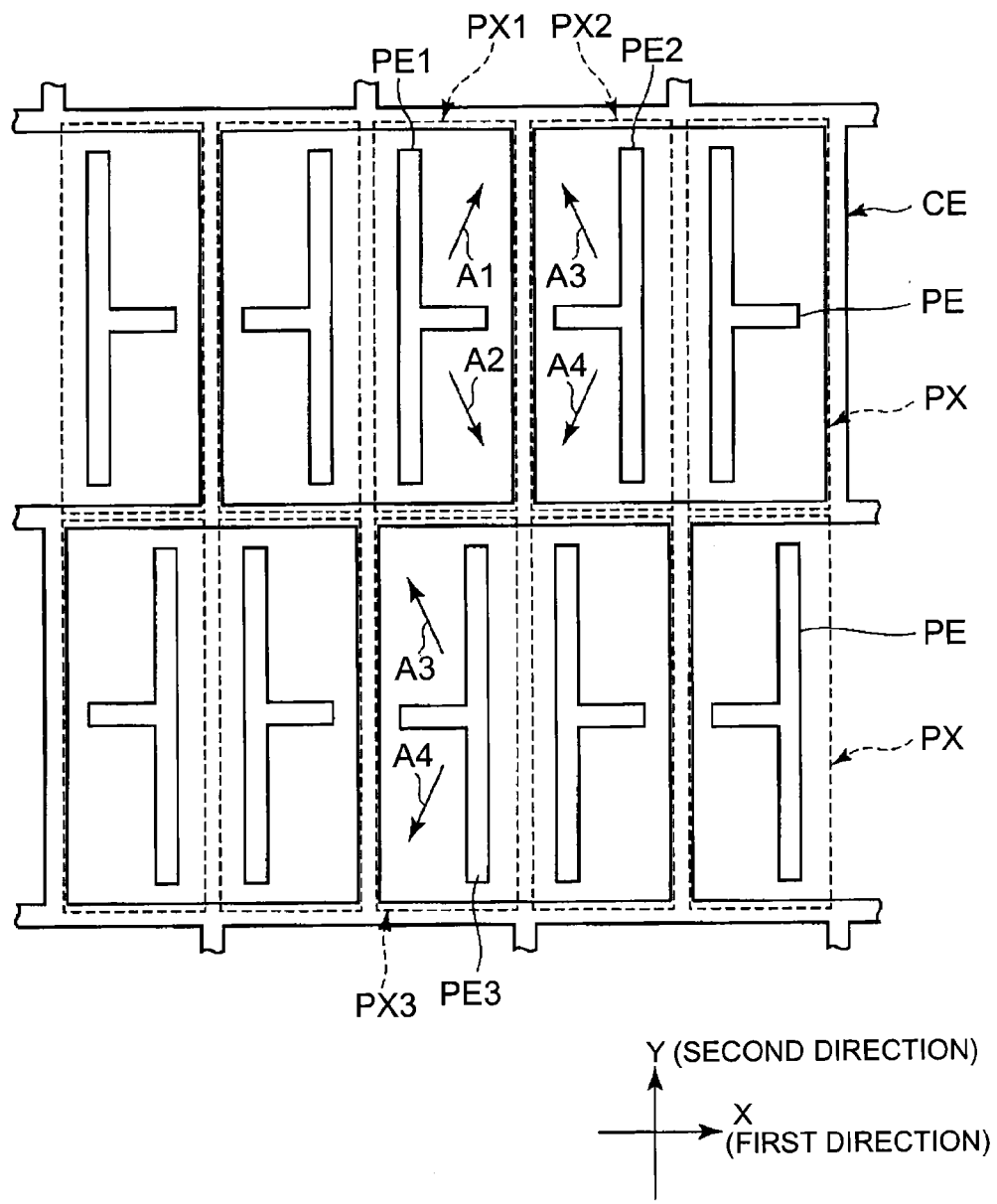
FIG. 12 is a figure schematically showing a layout of the active area according to the second embodiment.

FIG. 12 is a figure schematically showing an example of the layout of the active area according to the second embodiment. In addition, only the structure required for explanation is illustrated here.

First, when its attention is paid to the shape of the pixel electrode PE of each pixel PX, each pixel electrode PE of two pixels PX which adjoin in the first direction X is line symmetry with reference a the boundary between the pixels. In the illustrated example, the shape of the first pixel electrode PE1 of the first pixel PX1 is the same as shown in FIG. 10. The shape of the second pixel electrode PE2 of the second pixel PX2 which adjoins the first pixel PX1 on the right-hand side is line symmetry with reference to a boundary between the first pixel PX1 and the second pixel PX2. In addition, the shape of the pixel electrode of the pixel which adjoins the first pixel PX1 on the left-hand side is also the same as the second pixel electrode PE2. That is, the left-right directions of the pixel electrode PE are alternately reversed every pixel PX located in a line in the first direction X.

Moreover, in the illustrated example, the shape of a third pixel electrode PE3 of a third pixel PX3 which adjoins the first pixel PX1 on the bottom side is the same as the second pixel electrode PE2 of the second pixel PX2. Although not illustrated, the pixel electrode of the pixel which adjoins the first pixel PX1 on the upper portion is also the same as the second pixel electrode PE2. That is, the upper-down directions of the pixel electrode are alternately reversed every the pixel electrode PE of each pixel PX located in a line in the second direction Y.

The common electrode CE is arranged along a boundary between adjacent pixels PX, and includes a L character shape portion which faces the L character portion of the pixel electrode PE.

In the above layout, at the time of ON when the direction of the initial alignment of the liquid crystal molecule LM is set up in the second direction Y, and potential difference is formed between the pixel electrode PE and the common electrode CE of each pixel PX, for example, the long axis of the liquid crystal molecule LM turns to the direction of the upper right shown by an arrow A1 in the upper half of the first pixel PX1. In the lower half of the first pixel PX1, the long axis of the liquid crystal molecule LM turns to the direction of the lower right shown by an arrow A2. In the upper half of second pixel PX2, the long axis of the liquid crystal molecule LM turns to the direction of the upper left shown by an arrow A3. The long axis of the liquid crystal molecule LM turns to the direction of the lower left shown by an arrow A4 in the lower half of second pixel PX2. The same thing can be said also between the first pixel PX1 and the third pixel PX3. That is, in two adjoining pixels PX, it becomes possible to form four domains.

Figure 13:
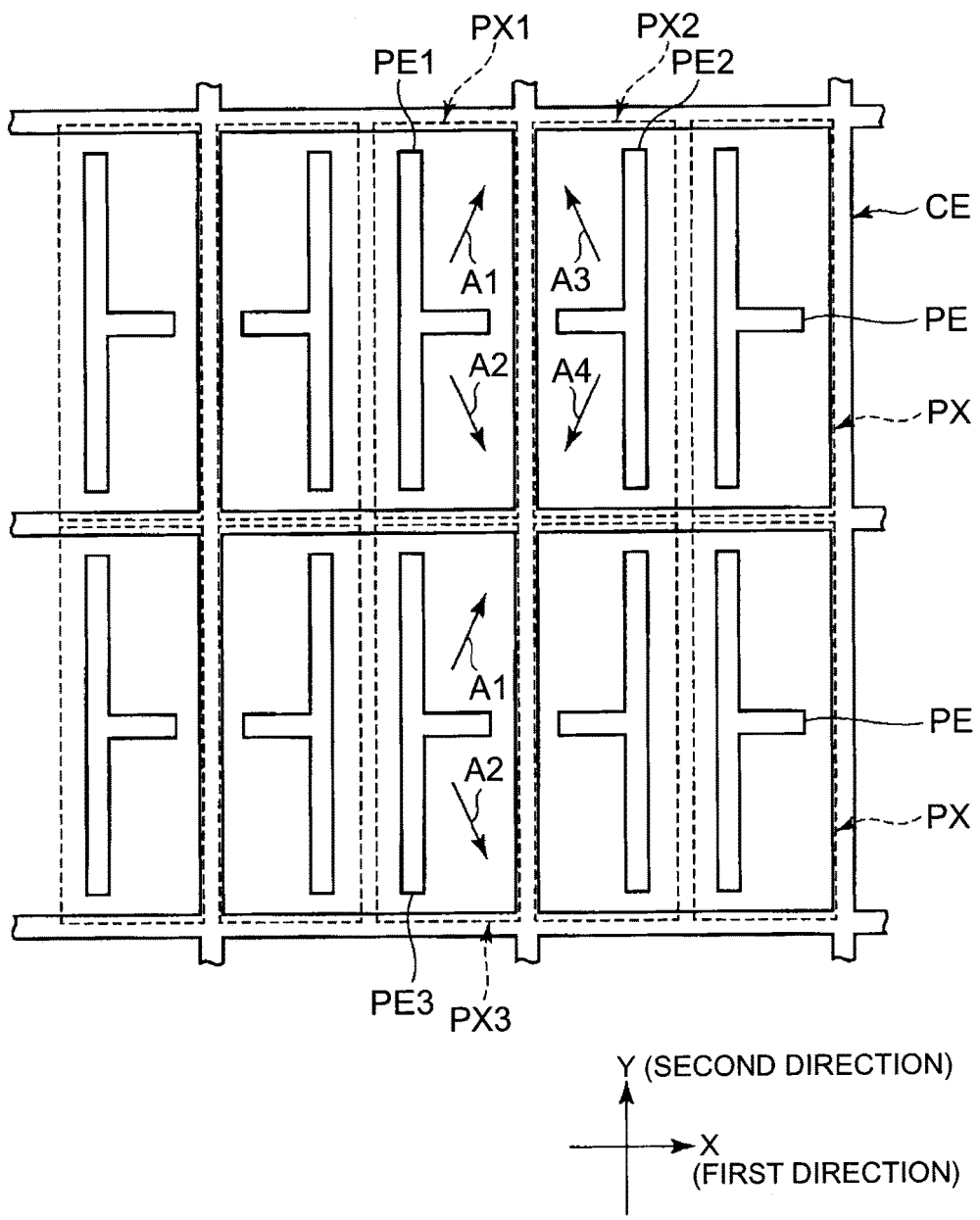
FIG. 13 is a figure schematically showing a modification of the layout of the active area according to the second embodiment.

FIG. 13 is a figure schematically showing a modification of the layout of the active area according to the second embodiment. In addition, only the structure required for explanation is illustrated here.

The layout shown here is different as compared with the layout shown in FIG. 12 in that each pixel electrode PE of the pixel PX which adjoins in the second direction Y has the same shape.

In the illustrated example, the second pixel electrode PE2 of the second pixel PX2 which adjoins the first pixel PX1 on the right-hand side is line symmetry with reference to a boundary between the first pixel PX1 and the second pixel PX2. The shape of the pixel electrode which adjoins the first pixel electrode PE1 of the first pixel PX1 on the left-side is also the same as the second pixel electrode PE2. Moreover, the shape of the third pixel electrode PE3 of the third pixel PX3 which adjoins the first pixel PX1 on the lower side is the same as the first pixel electrode PE1, and although not illustrated, the shape of the pixel electrode of the pixel which adjoins the first pixel PX1 on the upper side is also the same as the first pixel electrode PE1. That is, the pixel electrode PE of each pixel PX located in a line in the second direction Y is the same shape altogether.

The common electrode CE is arranged along a boundary between adjacent pixels PX, and includes a L character shape portion which faces the L character portion of the pixel electrode PE.

Also in the above layout, at the time of ON when the direction of the initial alignment of the liquid crystal molecule LM is set up in the second direction Y, and potential difference is formed between the pixel electrode PE of each pixel PX and the common electrode CE, for example, in the upper half of the first pixel PX1, the long axis of the liquid crystal molecule LM turns to the direction of the upper right shown by an arrow A1. In the lower half of the first pixel PX1, the long axis of the liquid crystal molecule LM turns to the direction of the lower right shown by an arrow A2. In the upper half of the second pixel PX2, the long axis of the liquid crystal molecule LM turns to the direction of the upper left shown by an arrow A3, and the long axis of the liquid crystal molecule LM turns to the direction of the lower left shown by an arrow A4 in the bottom half of second pixel PX2. That is, it becomes possible to form four domains in two pixels PX which adjoin in the first direction X.

As explained above, according to the embodiments, it becomes possible to offer the high quality liquid crystal display device.

While certain embodiments have been described, these embodiments have been presented by way of example only, and are not intended to limit the scope of the inventions. Indeed, the novel embodiments described herein may be embodied in a variety of other shapes; furthermore, various omissions, substitutions and changes in the shape of the embodiments described herein may be made without departing from the spirit of the inventions. The accompanying claims and their equivalents are intended to cover such shapes or modifications as would fall within the scope and spirit of the inventions.

What is claimed is:

1. A liquid crystal display device having a plurality of pixels, comprising:
   a first substrate including:
      first and second gate lines extending in a first direction,
      first and second source lines extending in a second direction orthogonally crossing the first direction,
      a pixel electrode including a sub-pixel electrode, a first main pixel electrode, and a second main pixel electrode, and
      an auxiliary capacitance line extending in the first direction under the sub-pixel electrode through an insulating film, wherein
      the sub-pixel electrode is arranged substantially in a center of the pixel extending in the first direction,
      the first main pixel electrode is connected with one end of the sub-pixel electrode and extends in the second direction,
      the second main pixel electrode is connected with the other end of the sub-pixel electrode and extends in the second direction opposite to the extending direction of the first main pixel electrode,
      the first main pixel electrode is arranged along the first source line, and forms a first L shape with the sub-pixel electrode, and
      the second main pixel electrode is arranged along the second source line, and forms a second L shape with the sub-pixel electrode;
   a second substrate facing the first substrate; and
   a liquid crystal layer including liquid crystal molecules and held between the first substrate and the second substrate,
   wherein a first aperture is formed with the second main pixel electrode; and the sub-pixel electrode,
   a second aperture is formed with the first main pixel electrode and the sub-pixel electrode,
   an area of the first aperture is substantially equal to an area of the second aperture,
   a center point of the pixel is located on the sub-pixel electrode,
   the first main pixel electrode and the second main pixel electrode are symmetrical with reference to the center point,
   a width of the sub-pixel electrode is greater than a width of the auxiliary capacitance line,
   the auxiliary capacitance line is not exposed from the sub-pixel electrode between the first and second source lines,
   an initial alignment direction of the liquid crystal molecules is parallel to the first and second main pixel electrodes, and
   the pixel electrode does not include any electrode between the one end of the sub-pixel electrode and the second gate line, and does not include any electrode between the other end of the sub-pixel electrode and the first gate line.

2. The liquid crystal display device according to claim 1, further comprising a first sub-common electrode and a second sub-common electrode which are arranged in common between adjacent pixels in the second direction.

3. The liquid crystal display device according to claim 1, wherein
   the shapes of respective pixel electrodes of a first pixel and a second pixel adjoining each other in the first direction is line symmetry with reference to a boundary between the first pixel and the second pixel.

4. The liquid crystal display device according to claim 3, wherein
   the shape of a pixel electrode of a third pixel adjoining the first pixel in the second direction is the same as that of the second pixel.

5. The liquid crystal display device according to claim 3, wherein
   the shape of a pixel electrode of a third pixel adjoining the first pixel in the second direction is the same as that of the first pixel.

6. The liquid crystal display device according to claim 1, wherein in a plan view, no gap exists between the first source line and the first main pixel electrode and between the second source line and the second main pixel electrode.

7. The liquid crystal display device according to claim 1, wherein the pixel electrode does not include any electrode extending toward the first source line further than the first main pixel electrode, and does not include any electrode extending toward the second source line further than the second main pixel electrode.

8. The liquid crystal display device according to claim 1, wherein the pixel electrode does not include any electrode between the first main pixel electrode and the second source line, and does not include any electrode between the second main pixel electrode and the first source line.

* * * * *